United States Patent
Wu et al.

(10) Patent No.: US 10,145,232 B2
(45) Date of Patent: Dec. 4, 2018

(54) METHODS AND APPARATUS FOR MULTI-WELL RANGING DETERMINATION

(71) Applicant: Halliburton Energy Services, Inc., Houston, TX (US)

(72) Inventors: Hsu-Hsiang Wu, Sugar Land, TX (US); Burkay Donderici, Houston, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/519,765

(22) PCT Filed: Nov. 18, 2014

(86) PCT No.: PCT/US2014/066168
§ 371 (c)(1),
(2) Date: Apr. 17, 2017

(87) PCT Pub. No.: WO2016/080968
PCT Pub. Date: May 26, 2016

(65) Prior Publication Data
US 2017/0254193 A1    Sep. 7, 2017

(51) Int. Cl.
*E21B 43/14*    (2006.01)
*E21B 43/30*    (2006.01)
(Continued)

(52) U.S. Cl.
CPC ........ *E21B 47/02216* (2013.01); *E21B 43/14* (2013.01); *E21B 43/305* (2013.01); *E21B 47/09* (2013.01); *G01V 3/28* (2013.01)

(58) Field of Classification Search
CPC ...... E21B 47/02216; E21B 7/04; E21B 7/046; G01B 3/26; G01B 3/28
See application file for complete search history.

(56) References Cited

U.S. PATENT DOCUMENTS

2002/0050930 A1    5/2002 Thomeer et al.
2009/0260878 A1    10/2009 Morley et al.
(Continued)

FOREIGN PATENT DOCUMENTS

WO    2012174516 A1    12/2012
WO    2016080968 A1    5/2016

OTHER PUBLICATIONS

"International Application Serial No. PCT/US2014/066168, International Preliminary Report on Patentability dated Sep. 30, 2016", 6 pgs.
(Continued)

*Primary Examiner* — D. Andrews
*Assistant Examiner* — Dany E Akakpo
(74) *Attorney, Agent, or Firm* — Gilliam IP PLLC

(57) ABSTRACT

Disclosed embodiments include methods and apparatus for ranging techniques to detect and determine a relative distance and azimuthal direction of nearby target well conductors such as pipes, well casing, etc., from within a borehole of a drilling well. A nearby casing string of a target well can be detected by transmitting an electromagnetic signal from an excitation source located along the target well and measuring a response signal with an antenna on a downhole logging tool in the drilling well. Several different excitation sources for various target wells are utilized to distinguish nearby conductor signals from formation signals. Joint] inversion algorithms are utilized to identify multi]well locations on the basis of measured signal responses from the different excitations sources. The joint]inversions may be implemented in real]time or during post]processing, and used in applications such as SAGD, anti]collision, and relief well development.

19 Claims, 10 Drawing Sheets

(51) Int. Cl.
 *E21B 47/022* (2012.01)
 *E21B 47/09* (2012.01)
 *G01V 3/28* (2006.01)

(56) References Cited

U.S. PATENT DOCUMENTS

2011/0139507 A1  6/2011 Krueger et al.
2011/0308794 A1  12/2011 Bittar et al.
2014/0111210 A1* 4/2014 Fang .................. E21B 47/0905
                                                              324/346

OTHER PUBLICATIONS

"International Application Serial No. PCT/US2014/066168, International Search Report dated Aug. 18, 2015", 3 pgs.
"International Application Serial No. PCT/US2014/066168, Written Opinion dated Aug. 18, 2015", 6 pgs.
"Venezuela Application Serial No. 2015-000801, Office Action dated Aug. 16, 2016".

* cited by examiner

METHODS AND APPARATUS FOR MULTI-WELL RANGING DETERMINATION

BACKGROUND

The present disclosure relates generally to methods and apparatus for ranging techniques to determine distance and direction between nearby conductors.

With much of the world's easily obtainable oil having already been produced, new techniques are being developed to extract less accessible hydrocarbons. These techniques often involve drilling a borehole in close proximity to one or more existing wells. Examples of directed drilling near an existing well include intersection for blowout control, multiple wells drilled from an offshore platform, and closely spaced wells for geothermal energy recovery. Another such technique is steam-assisted gravity drainage (SAGD) that uses a pair of vertically-spaced, horizontal wells less than 10 meters apart. Careful control of the spacing is important to the technique's effectiveness.

One way to direct a borehole in close proximity to an existing well is "access-dependent active ranging" in which an electromagnetic source is located in the existing well and monitored via sensors on the drill string. Systems that locate both the source and the sensors on the drill string are often termed "access-independent active ranging". Existing ranging techniques often only consider one surrounding casing of an existing well (e.g., a target well) relative to the drilling well, and are unable to identify multiple targets downhole, which limits the use of these techniques.

DETAILED DESCRIPTION

This disclosure describes various ranging techniques to determine relative distances and relative directions among wells based on current excitations placed in multiple cased-hole wells, and electromagnetic antennas equipped in a logging tool in a drilling well. A nearby casing string of a target well can be detected by transmitting an electromagnetic signal from an excitation source located along the target well and measuring a response signal with an antenna on a downhole logging tool in the drilling well. Several different excitation sources for various target wells are utilized to distinguish nearby conductor signals from formation signals. Joint-inversion algorithms are used to identify multi-well locations on the basis of signals from different excitation sources.

There is a need for the ability to identify relative distance and direction among multiple wells by various types of excitation sources in practice. The ability to resolve multiple targets downhole would allow for the steering of a drill bit through a field crowded with existing, producing oil wells as part of constructing a new well, without interrupting production of any of the other existing wells in the field.

Processing methods based on joint-inversion among different types of excitation sources are presented to identify distance and direction between the drilling well and one adjacent well. The use of joint-inversion among various excitations allows for the ability to resolve multiple targets. Decoupling signals from multiple targets, including formation anisotropy and a plurality of nearby casings, results in the ability to identify multi-well locations on the basis of measured signal responses from the different excitations sources. The joint-inversions may be implemented in real-time or during post-processing for applications such as Steam-Assisted Gravity Drainage (SAGD), anti-collision, and relief well development.

Figure 1:
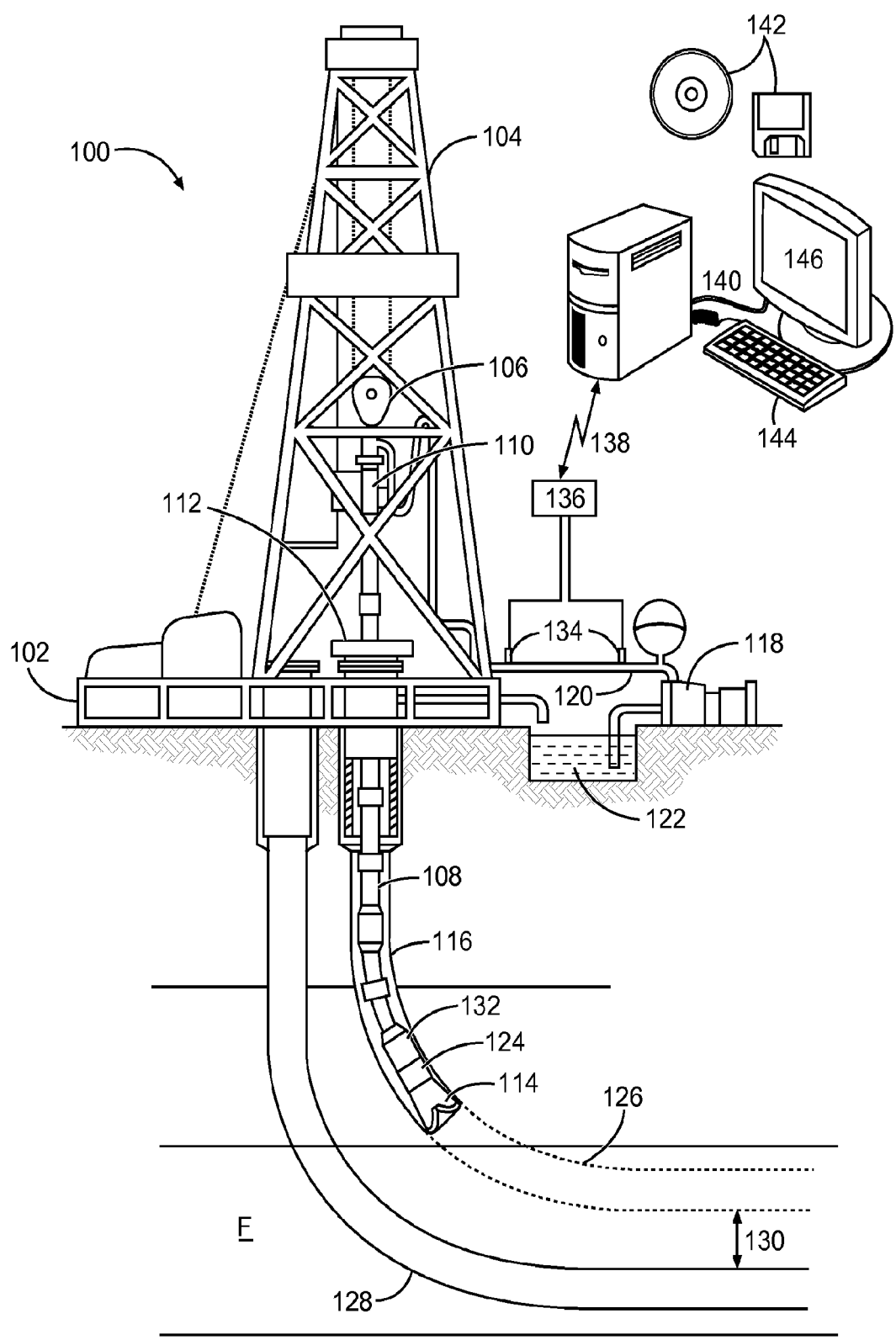
FIG. 1 depicts an example drilling environment in which multi-well ranging may be employed according to various embodiments.

The disclosed tools and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (a.k.a. rotational or azimuthal orientation), an inclination angle (the slope), and a compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 124 to induce a current in nearby conductors such as pipes, casing strings, and conductive formations and to collect measurements of the resulting field to determine distance and direction. Using these measurements in combination with the tool orientation measurements, the driller can, for example, steer the drill bit 114 along a desired path 126 relative to the existing well 128 in formation using any one of various suitable directional drilling systems, including steering vanes, a "bent sub", and a rotary steerable system. For precision steering, the steering vanes may be the most desirable steering mechanism. The steering mechanism can be alternatively controlled downhole, with a downhole controller programmed to follow the existing borehole 128 at a predetermined distance 130 and position (e.g., directly above or below the existing borehole).

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may employ acoustic telemetry, electromagnetic telemetry, or telemetry via wired drillpipe.

The digitizer 136 supplies a digital form of the telemetry signals via a communications link 138 to a computer 140 or some other form of a data processing device. The computer 140 operates in accordance with software (which may be stored on information storage media 142) and user input via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly.

Figure 2B:
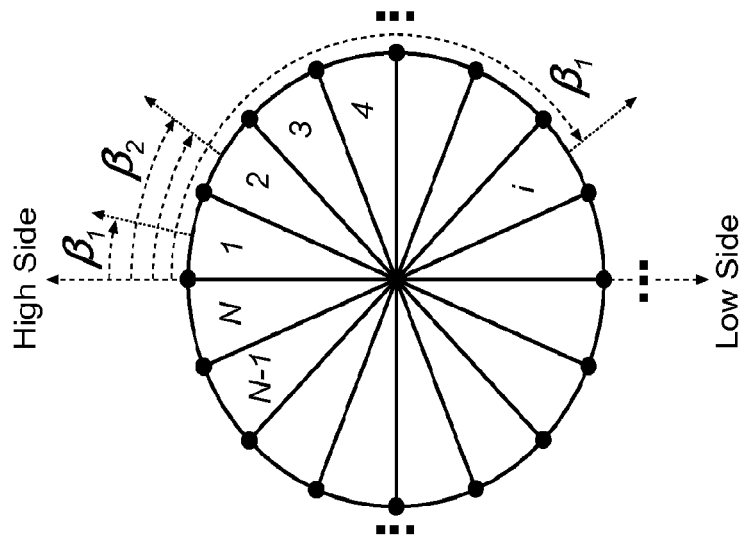
FIGS. 2A-2B show an example ranging tool embodiment and illustrate variables used in analyzing the operations of the ranging tool
Figure 2A:
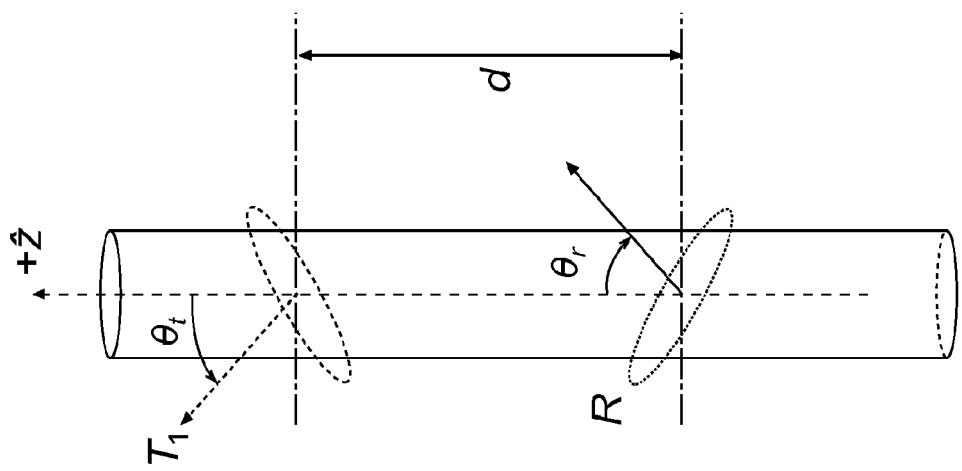

FIG. 2A shows an example tool model having a longitudinal axis coincident with a coordinate z-axis. A transmitter antenna coil $T_1$ is provided with a tilt angle $\theta_{T1}$ relative to the z-axis and a receiver antenna coil R is provided with a tilt angle $\theta_R$ relative to the z-axis, usually with its normal vector in the same plane defined by the z-axis and the normal vector of the transmitter antenna coil. The transmitter and receiver antenna coils are centered on the z-axis with their center points separated by a distance d. The x- and y-axes of the example tool model are shown in FIG. 2B, which shows an example configuration of tool bin positions and corresponding azimuthal angles. The x-axis is directed from the z-axis toward the high side of the borehole. (For vertical boreholes, the north side of the borehole is often taken as the "high" side.) The y-axis is drawn perpendicular to the x- and z-axes using the right hand rule. The azimuthal angle β is measured from the x-axis starting in the direction of the y-axis. The measurements taken around the circumference of the borehole are often grouped into azimuthal bins. As illustrated in FIG. 2B, each bin i may be associated with a representative azimuthal angle $\beta_i$. Alternatively, the measurements can be grouped into bins along the z-axis.

The methods and apparatus described herein may be used in various borehole configurations, such as a borehole including a vertically-oriented borehole configuration, a horizontal penetration direction, or an oblique borehole configuration, for example. Further, although the example of FIG. 1 also generally illustrates a land-based example, the apparatus and techniques described herein may be used in offshore environments as well, such as for subsea operations. In particular, offshore or subsea operations may include use of LWD/MWD apparatus and techniques including aspects of the examples herein.

LWD magnetic ranging techniques, using electromagnetic resistivity logging tools based on, for example, the tool models described in FIGS. 2A-2B, determine a relative distance and direction between two wells using tilted transmitters in a logging tool. The transmitters transmit electromagnetic signals into formation that induce a current in an adjacent, target well (with casing), such that a tilted receiver in the logging tool is able to determine a relative direction and distance to the target well based on received azimuthal measurements. That is, the induced current in the target well generates an electromagnetic field that is received by the tilted receiver in the logging tool.

An azimuthal signal received at the receiver may be represented using the following equation:

$$V_B^T(\beta_i) = A_{Double} \cos 2(\beta_i + \beta_0) + A_{Single} \cos(\beta_i + \beta_0) + A_{Const} \quad (1)$$

where $\beta_i$ represents the tool azimuth as depicted in FIG. 2B and $\beta_0$ represents the angle between the tool's high side and the direction to the target well. $A_{Double}$, $A_{single}$, and $A_{Const}$ are complex numbers representing the received amplitude of double sinusoidal, single sinusoidal, and constant signals with respect to the tool azimuth angles, respectively.

The majority of the signal (e.g., the electromagnetic field generated by the induced current along the casing of the target well) received from the target well is $A_{Double}$, so that the double sinusoidal responses are utilized to determine relative distance and direction to the target well. Due to the double periods, two angles are calculated for the relative direction to the target well, which causes ambiguity in ranging direction determination. Single sinusoidal responses with one period are used to resolve such ambiguities. However, the $A_{Double}$ signal is weak if the logging tool is positioned too far away from the target well (depending on the selected operating frequency). Consequently, such ambiguity issues affect ranging decisions and pose a challenge if further detection ranges are required. A downhole current excitation (e.g., current- or voltage-controlled source) positioned by wireline system in a cased-hole target well may be utilized to determine the correct ranging direction.

Figure 3:
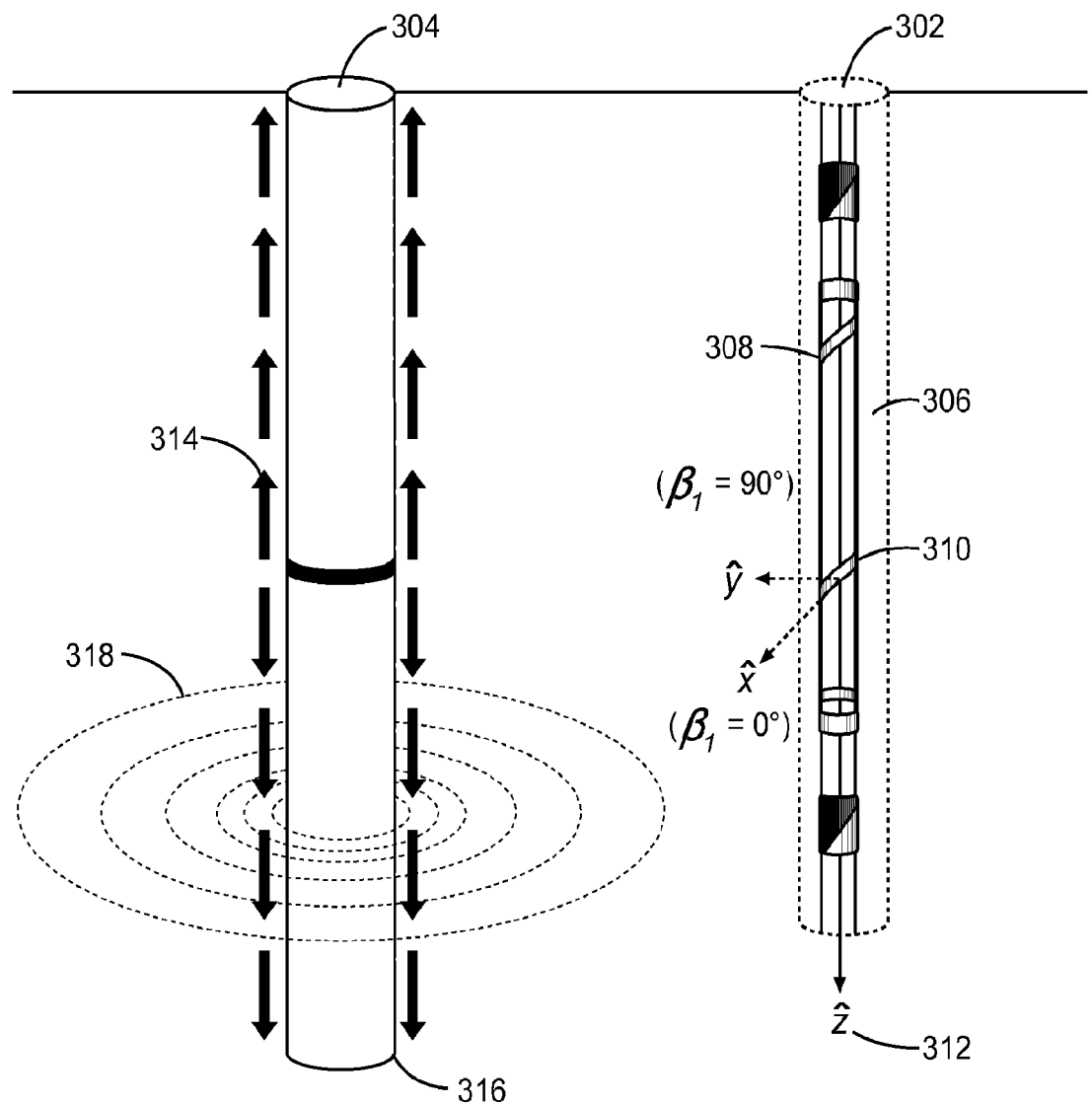
FIG. 3 illustrates a side elevational view of an example system embodiment for determining an azimuthal direction between a drilling well and a target well.
Figure 4A:
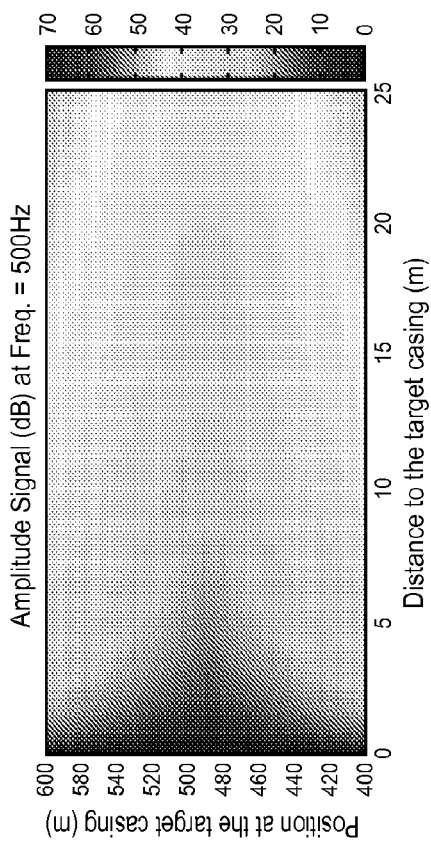
FIGS. 4A-4D illustrate example modeled amplitudes of magnetic fields surrounding excitation sources in target wells according to various embodiments.
Figure 4B:
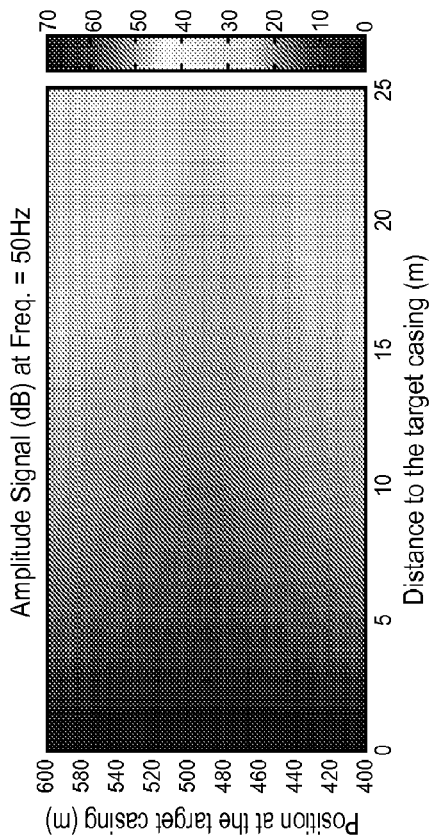
Figure 4C:
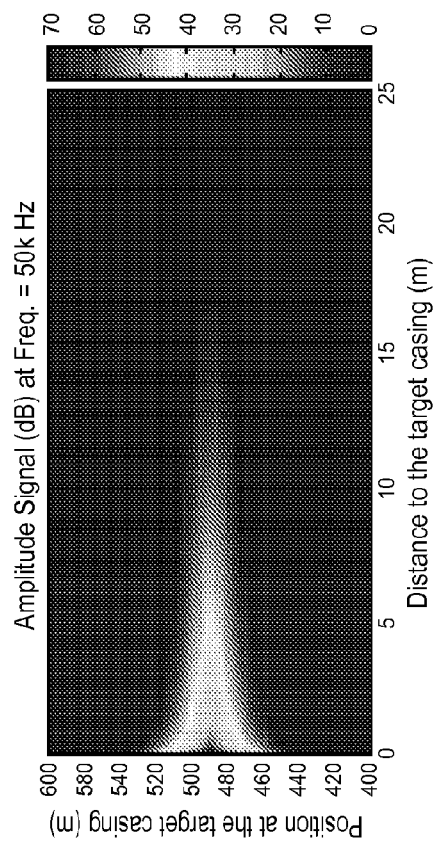
Figure 4D:
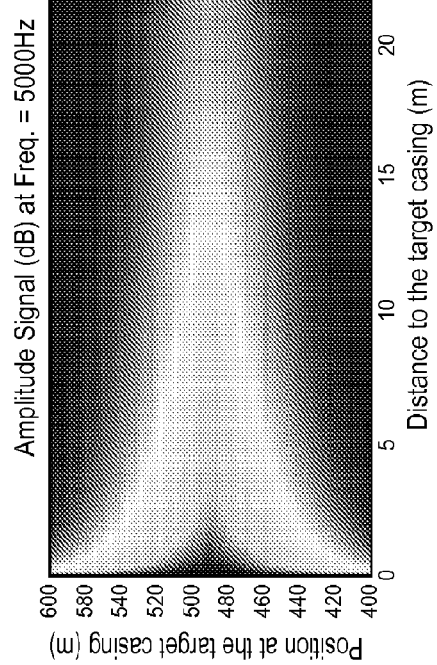

FIG. 3 illustrates an example system, showing a typical SAGD application, having two excitation sources, wherein one excitation source and receiver is located at a drilling well 302 is parallel to a target well 304 including the other excitation source. A LWD tool 306 located in the drilling well 302 is equipped with a transmitter 308 and a receiver 310. The LWD tool 306 coordinates are shown in FIG. 3, where the y-axis (corresponding to a tool azimuth of 90 degrees) direction points to the target well 304 and the z-axis direction is along a drilling path 312. In this example, a downhole current excitation source (e.g., either a current- or voltage-controlled source) is positioned inside the target well 304, with a grounding position positioned at various surface locations or at a well-head of the target well 304. The downhole current excitation source (not shown) of the target well 304 introduces a current 314 that flows along a casing 316 of the target well 304, and generates a magnetic field 318 that surrounds the target well 304.

FIGS. 4A-4D illustrate example modeled amplitudes (in dB) of magnetic fields surrounding excitation sources in target wells. As illustrated, excitation sources at lower frequencies will introduce more signals to a receiver positioned in a proximate drilling well (e.g., receiver 310 in drilling well 302 of FIG. 3) for the same distance to the target casing. However, very low frequency measurements might be affected by the Earth's magnetic and rotation due to LWD rotation operations. Therefore, an exemplary operation frequency of 50 kHz (associated with FIG. 4D) is used for the SAGD ranging application as illustrated in FIG. 3, where typical ranging distances are within 5 to 10 meters.

Figure 5A:
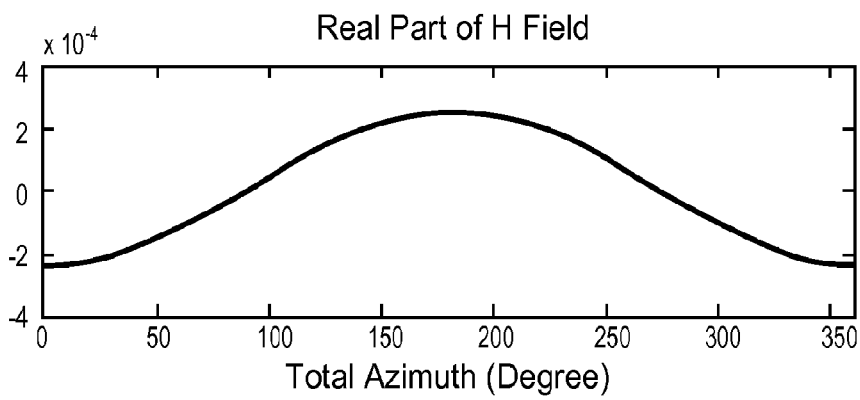
FIGS. 5A-5B are graphs of the received azimuth signals of the single sinusoidal responses according to various embodiments.
Figure 5B:
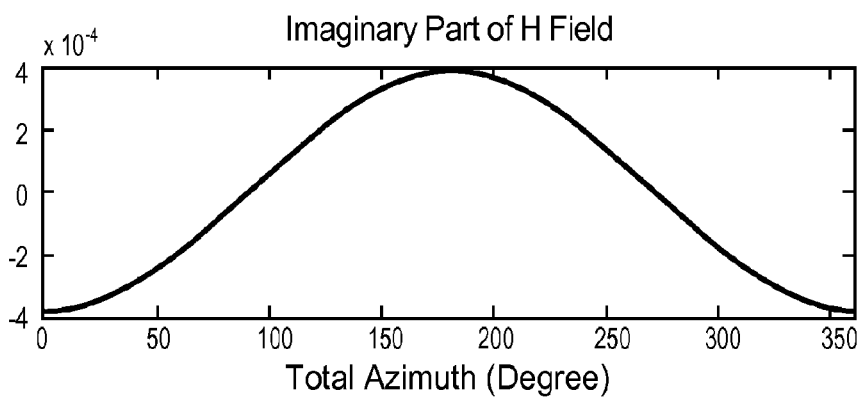
Figure 6A:
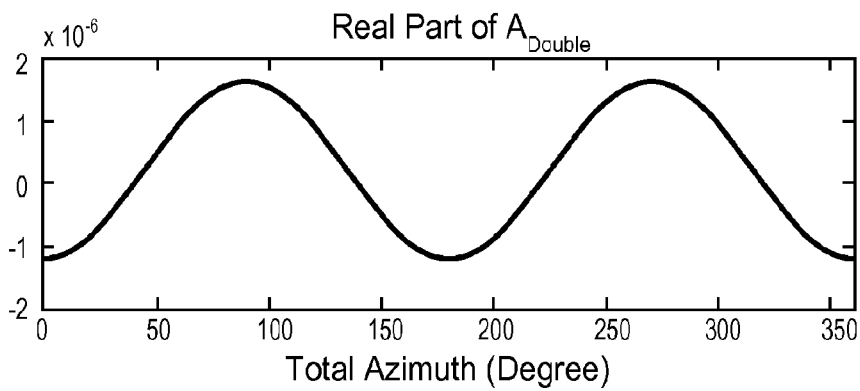
FIGS. 6A-6B are graphs of the received azimuth signals of the double sinusoidal responses according to various embodiments.
Figure 6B:
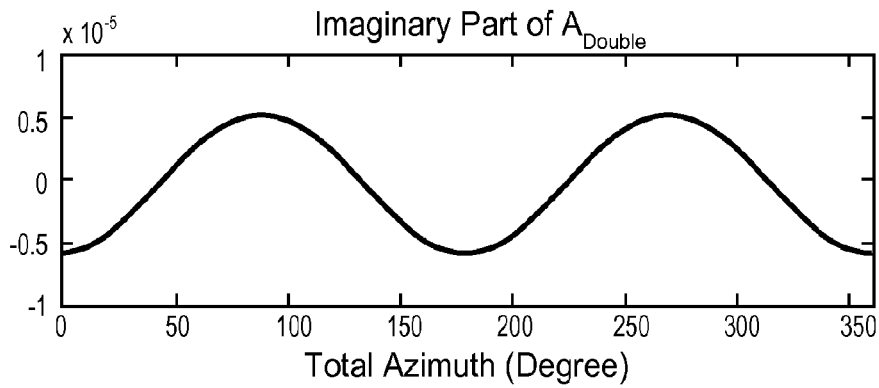

In an example operation, the receiver 310 in the drilling well 302 receives azimuth signals generated in response to the downhole current excitation source (not shown) of the target well 304. The azimuth signals graphed in FIGS. 5A-5B and 6A-6B illustrate the real and imaginary portions of the response signal received at the receiver 310. In particular, FIGS. 5A-5B show the real-portions and imaginary-portions, respectively, of the received azimuth signals at the receiver 310 of FIG. 3 in the drilling well 302 due to the excitation source in the target well 304 with an operating frequency of 50 kHz. FIGS. 6A-6B show the real-portions and imaginary-portions of the received azimuth signals of the double sinusoidal signal (e.g., $A_{Double}$) at the same receiver 310 with respect to the firing of the transmitter 308 (also operated at 50 kHz) in the drilling well 302 of FIG. 3.

The double sinusoidal wave in FIGS. 6A-6B may be used to calculate the distance and direction to the target casing. However, although the target casing 316 is positioned at an azimuth of 90 degrees relative to the LWD tool 306, the azimuth response calculations as illustrated in FIGS. 6A-6B show the acquiring of two different azimuth directions (e.g., 90° and 270°) relative to the target well 304. Due to its double period (e.g., $\cos 2(\beta_i + \beta_0)$), the measured double-sinusoidal azimuth response will also have a 180° ambiguity for measuring the casing's azimuthal angle. Since the single-sinusoidal azimuth response only has a single period (e.g., $\cos(\beta_i + \beta_0)$), it can be used to resolve this ambiguity for a unique determination of the azimuthal angle. The distance can then be estimated based on the amplitudes of the components. Therefore the azimuth responses of FIGS. 5A-5B are used together with the azimuth responses of FIGS. 6A-6B to resolve the ambiguity and identify which azimuth angle is the direction to the target well 304.

The excitation source of the target well 304 may not necessarily be turned on at all times, since the azimuthal responses illustrated in FIGS. 5A-5B are only used to identify the target well direction. Only a few shots corresponding to the target well excitation are required to resolve the azimuth direction ambiguity related to excitation of the transmitter 308 in the drilling well 302. It should also be understood that although directional calculations between wells are described herein, the azimuth responses of FIGS. 5A-5B, with known casing properties, may be decoupled to determine casing distance between the drilling well 302 and the target well 304.

Alternatively, the two excitations (e.g., with azimuth responses as illustrated in FIGS. 5A-5B and 6A-6B) from the wells may be combined to minimize formation effects (e.g., formation anisotropy effects) on ranging determination. To include both casing signals and formation signals, Eq. (1) may be modified and represented using the following equation:

$$V_B^T(\beta_i) = A_F(\beta_i + \beta_0) + A_C(\beta_i + \beta_1) \quad (2)$$

where $A_F(\beta_i + \beta_0) = A_{FDouble} \cos 2(\beta_i + \beta_0) + A_{FSingle} \cos(\beta_i + \beta_0) + A_{FConst}$; and $A_C(\beta_i + \beta_1) = A_{CDouble} \cos 2(\beta_i + \beta_1) + A_{CSingle} \cos(\beta_i + \beta_1) + A_{CConst}$. $A_F$ and $A_C$ are the formation signal and target casing signal, respectively, in response to the transmitter firing in the target well 304 of FIG. 3. $A^{FDouble}$ and $A_{CDouble}$ are the amplitudes of the mentioned double-sinusoidal responses for formation signal and casing signal, respectively. $A_{FSingle}$ and $A_{CSingle}$ are the amplitudes of the mentioned single-sinusoidal responses for formation signal and casing signal, respectively. $A_{FConst}$ and $A_{CConst}$ are the amplitudes of the mentioned constant responses for formation signal and casing signal, respectively. The angles $\beta_0$ and $\beta_1$ are the relative azimuth between the tool's high side and the formation (formation anisotropy or formation bed boundaries) and relative azimuth between the tool's high side and the direction to the target well, respectively.

By using relatively low operating frequencies for the transmitter 308 in the drilling well 302, formation signal $A_F$ may be eliminated owing to being relatively smaller than casing signal $A_C$. Therefore, the formation signal (including formation anisotropy and shoulder-bed effects) is negligible while operating at low frequencies. Thus, the casing signal $A_C$ may be decoupled from the received signal in Eq. (2) by knowing $\beta_1$ from the signals due to target well current excitation in FIGS. 5A-5B.

If the transmitter 308 is operated at relatively high frequencies such that the formation signal $A_F$ is much stronger than the casing signal $A_C$, then the received signal in Eq. (2) may be used to only determine formation relative azimuth angle $\beta_0$. With a known $\beta_0$ from high frequency measurements and a known $\beta_1$ from current excitation measurements, Eq. (2) may be decoupled to calculate formation properties (e.g., resistivity, anisotropy, etc.) and casing distance. It is noted that more than one operating frequency is used in both antennas in the drilling well and current excitations in the target well(s). Such multi-frequency measurements may be used to distinguish between casing signals and formation signals to achieve accurate ranging determination.

Figure 7A:
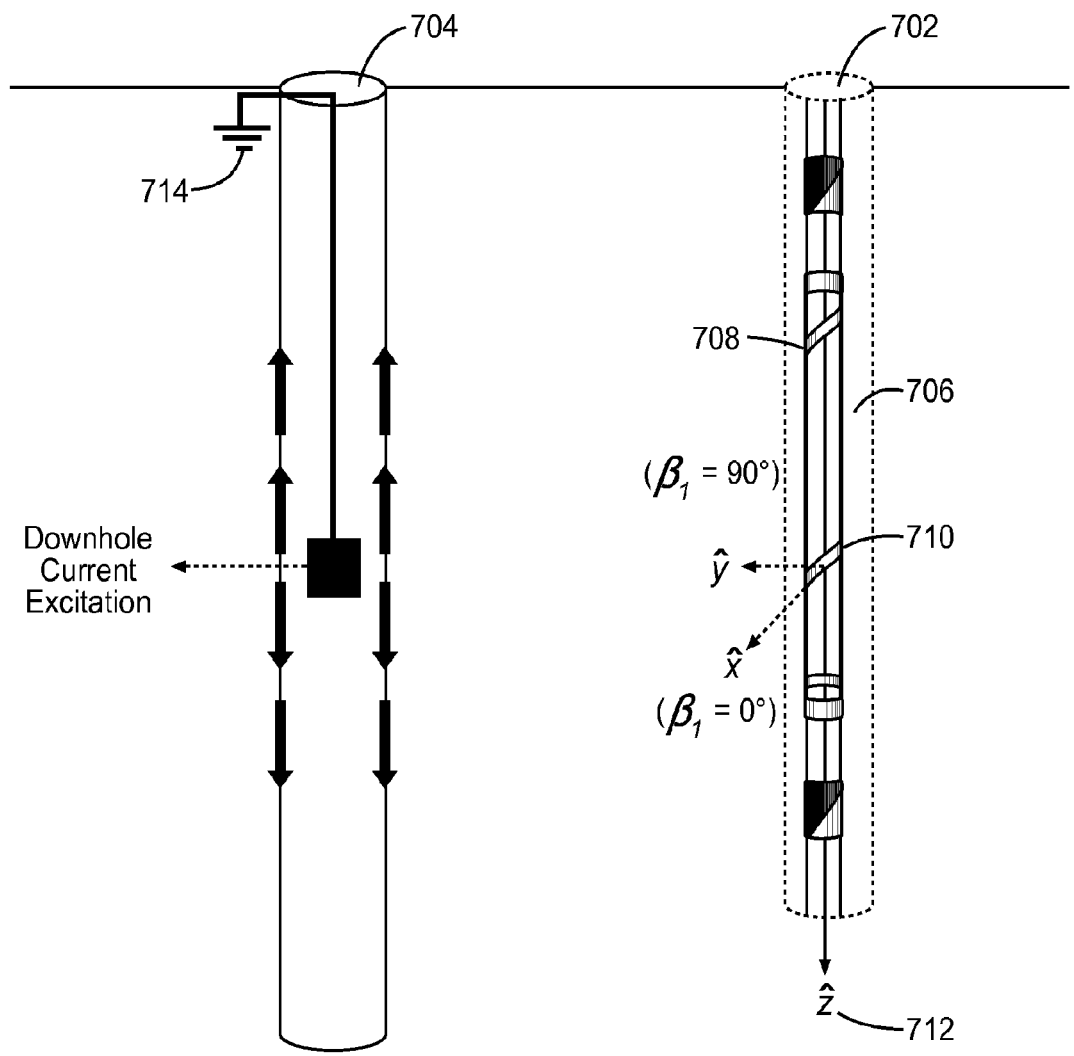
FIGS. 7A-7B illustrate two example configurations for a current excitation source according to various embodiments.
Figure 7B:
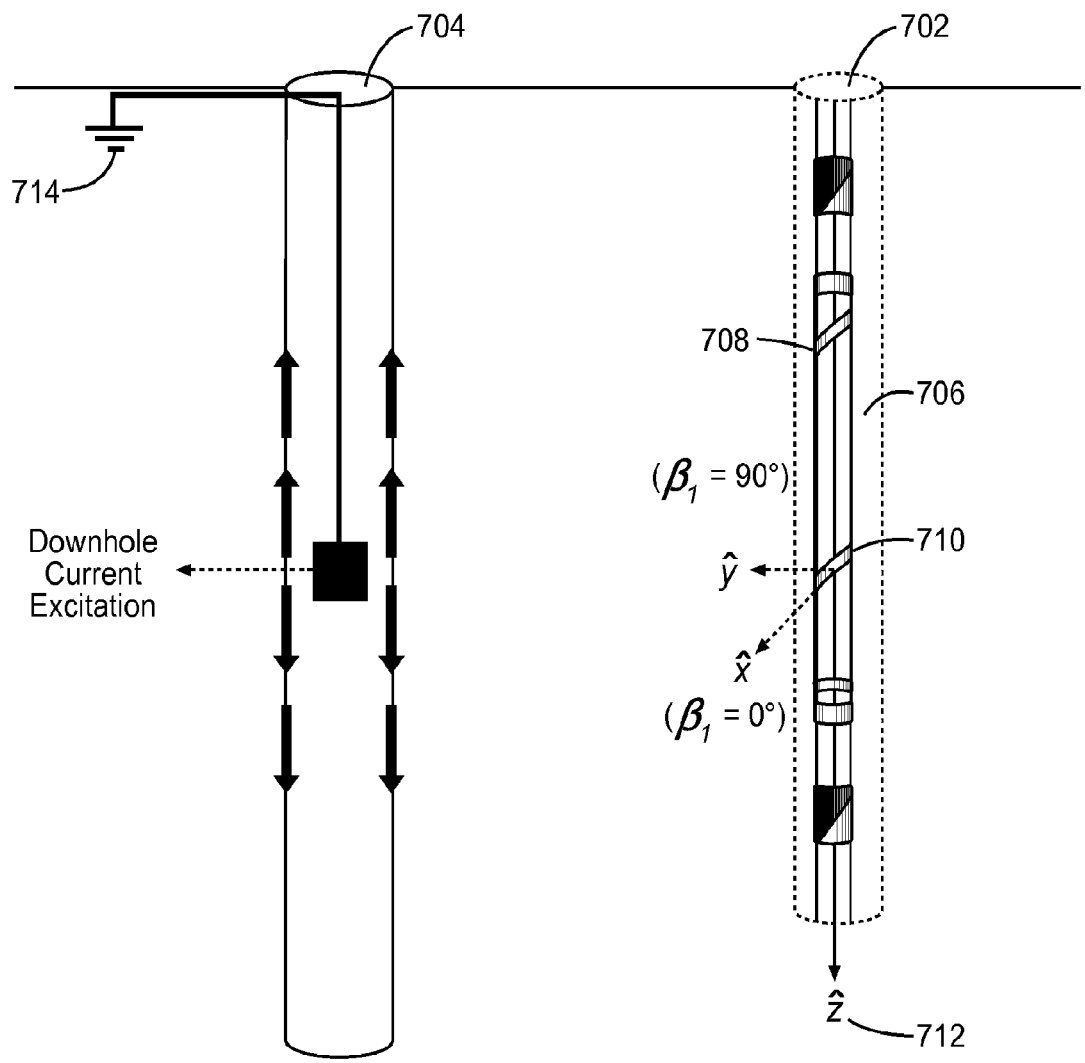

FIGS. 7A and 7B illustrate two example configurations for the current excitation source 700 at the target well 704. Similar to the example of FIG. 3, the system includes two excitation sources, wherein one excitation source and receiver is located at a drilling well 702 is parallel to a target well 704 including the other excitation source (e.g., current excitation source 700). A LWD tool 706 located in the drilling well 702 is equipped with a transmitter 708 and a receiver 710. The LWD tool 706 coordinates are shown in FIGS. 7A and 7B, where the y-axis (corresponding to a tool azimuth of 90 degrees) direction points to the target well 704 and the z-axis direction is along a drilling path 712. In these examples, a downhole current excitation source 700 (e.g., either a current- or voltage-controlled source) is positioned inside the target well 704, with a grounding position 714 positioned at the well-head (e.g., FIG. 7A) or far away from the well-head at the surface (e.g., FIG. 7B) to optimize the current flowing into the formation.

Figure 8:
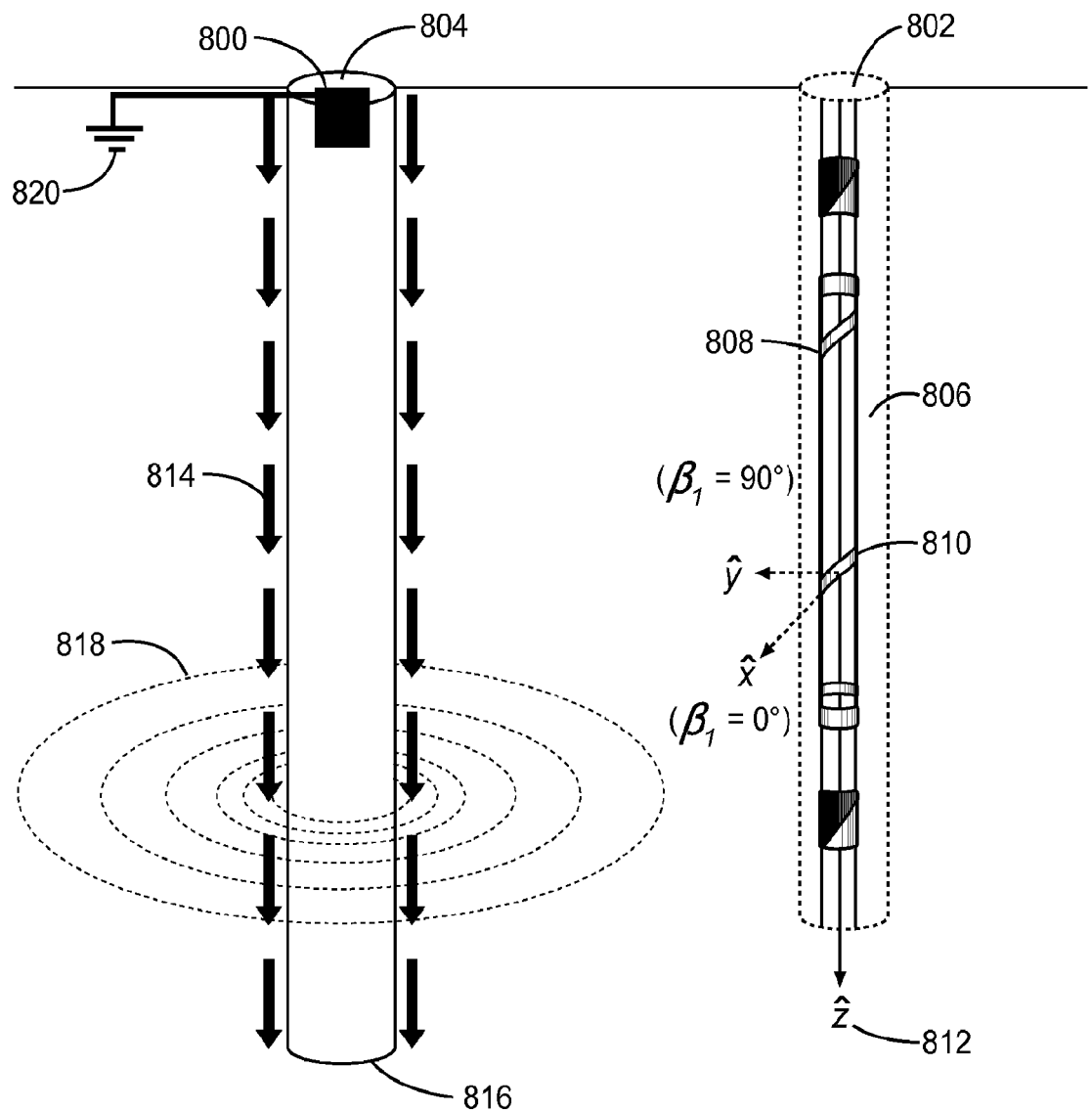
FIG. 8 illustrates an example configuration for a surface excitation source according to various embodiments.

FIG. 8 illustrates an alternative configuration in which, instead of a downhole excitation, a surface excitation source 800 at the well-head is used to enable current flowing downhole in the target well. This configuration includes two excitation sources, wherein one excitation source and receiver is located at a drilling well 802 is parallel to a target well 804, with the excitation source 800 located at the well-head. A LWD tool 806 located in the drilling well 802 is equipped with a transmitter 808 and a receiver 810. The LWD tool 806 coordinates are shown in FIG. 8, where the y-axis (corresponding to a tool azimuth of 90 degrees) direction points to the target well 804 and the z-axis direction is along a drilling path 812. In this example, the current excitation source (e.g., either a current- or voltage-controlled source) is a surface excitation source 800 positioned at a well-head of the target well 804. The surface excitation source 800 of the target well 804 introduces a current 814 that flows downhole along a casing 816 of the target well 804, and generates a magnetic field 818 that surrounds the target well 804. In this example, the grounding position 820 is positioned away from the well-head to increase the amount of current 814 flowing downhole.

Figure 9:
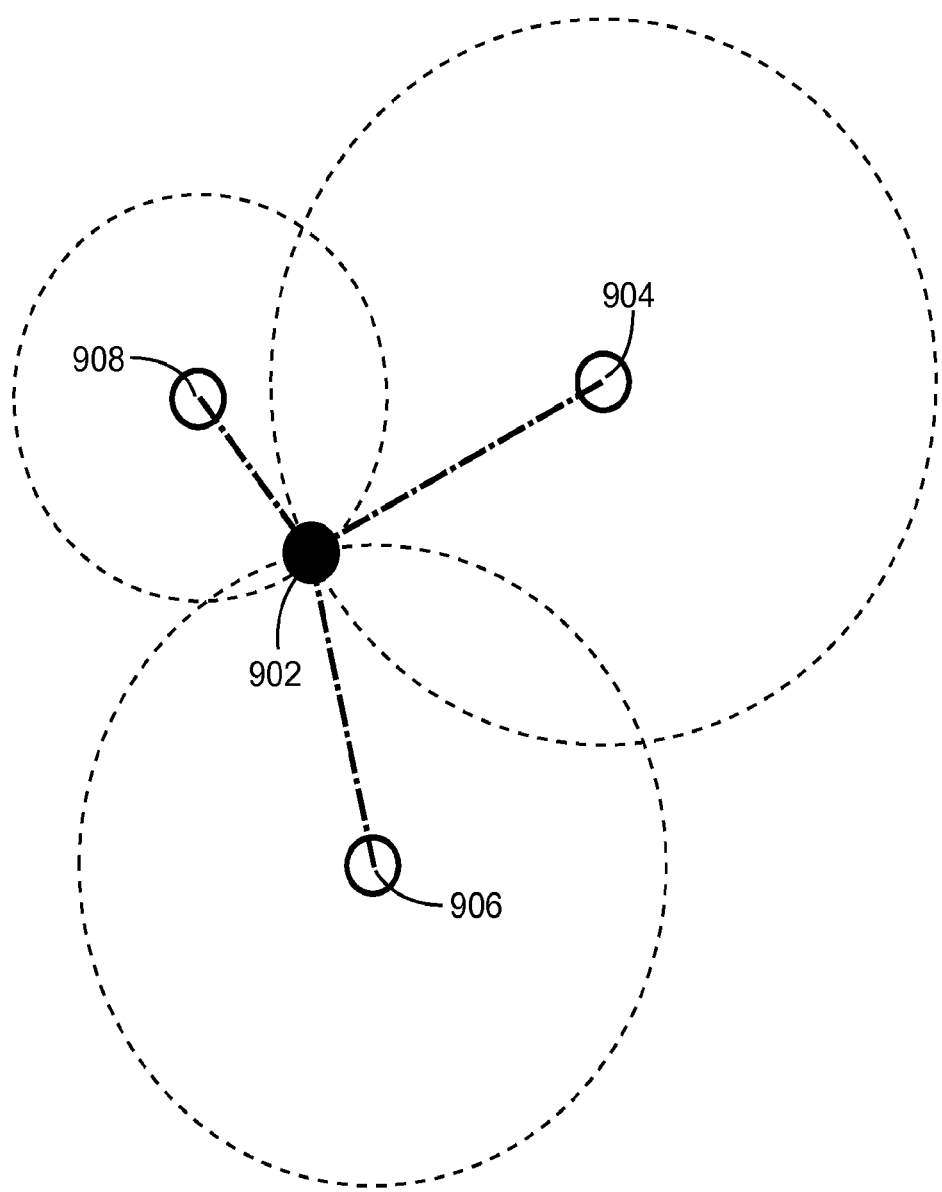
FIG. 9 illustrates a top view of target well locations relative to a drilling well for multi-well ranging determinations according to various embodiments.

FIG. 9 illustrates an example top view configuration of multiple target wells surrounding a drilling well 902. Target wells 904, 906, and 908 (e.g., representing targets of well number 1, well number 2, . . . and well number N) are cased and act as guide wells for drilling well 902. Currents are induced along the casings of the target wells according to the various excitation configurations described herein, and the magnetic fields are measured to obtain azimuth responses using a receiver positioned in the drilling well 902.

The azimuthal responses in response to the transmitter firing in the drilling well 902, for identifying multi-well locations, can be expressed by the following equation:

$$V_B^T(\theta_i) = A_F(\theta_i + \theta_0) + A_{C1}(\theta_i + \theta_1) + A_{C2}(\theta_i + \theta_2) + \ldots + A_{CN}(\theta_i + \theta_N) \quad (3)$$

where $A_{C1}$ to $A_{CN}$ represent the amplitudes of azimuthal signals caused by the casings of well number 1 to well number N nearby the drilling well 902, respectively. $A_F(\theta_i + \theta_0)$ can be negligible if the transmitter in the drilling well 902 is operated at low frequency ranges. By introducing excitation at a particular target well (e.g., target well 904/well number 1), the received signal in the drilling well 902 is able to identify a relative azimuth direction ($\theta_1$ with respect to well number 1) to the target well 904. Therefore, the azimuthal response in Eq. (3) may be decoupled using all identified relative azimuth angles for every well, and thereby the decoupled responses ($A_{C1}$ with respect to well number 1) can be used to calculate the distance to the target well 904 (e.g., well number 1). Similar methods can be applied to calculate distance to the other target wells (e.g., target wells 904,906/wells 2 through N).

As previously noted, the distance between wells can be estimated based on the amplitudes of the azimuthal responses. The azimuthal dependence of the measurements received at the receiver are analyzed to determine a diagonal component and a cross component as the LWD tool rotates. The transmitting and measuring are repeated during LWD tool rotations to determine the azimuthal dependence of the response signal, which are then analyzed to determine a diagonal component and a cross component. The amplitude of the diagonal component is indicative of distance to the conductive feature (e.g., target well casing). Direction can be determined based on the diagonal component alone or in combination with the cross component. Sinusoidal curve fitting can be employed to improve accuracy of the distance and direction estimates. In an example operation, the diagonal component is preferred as the basis for estimating a casing distance.

Figure 10:
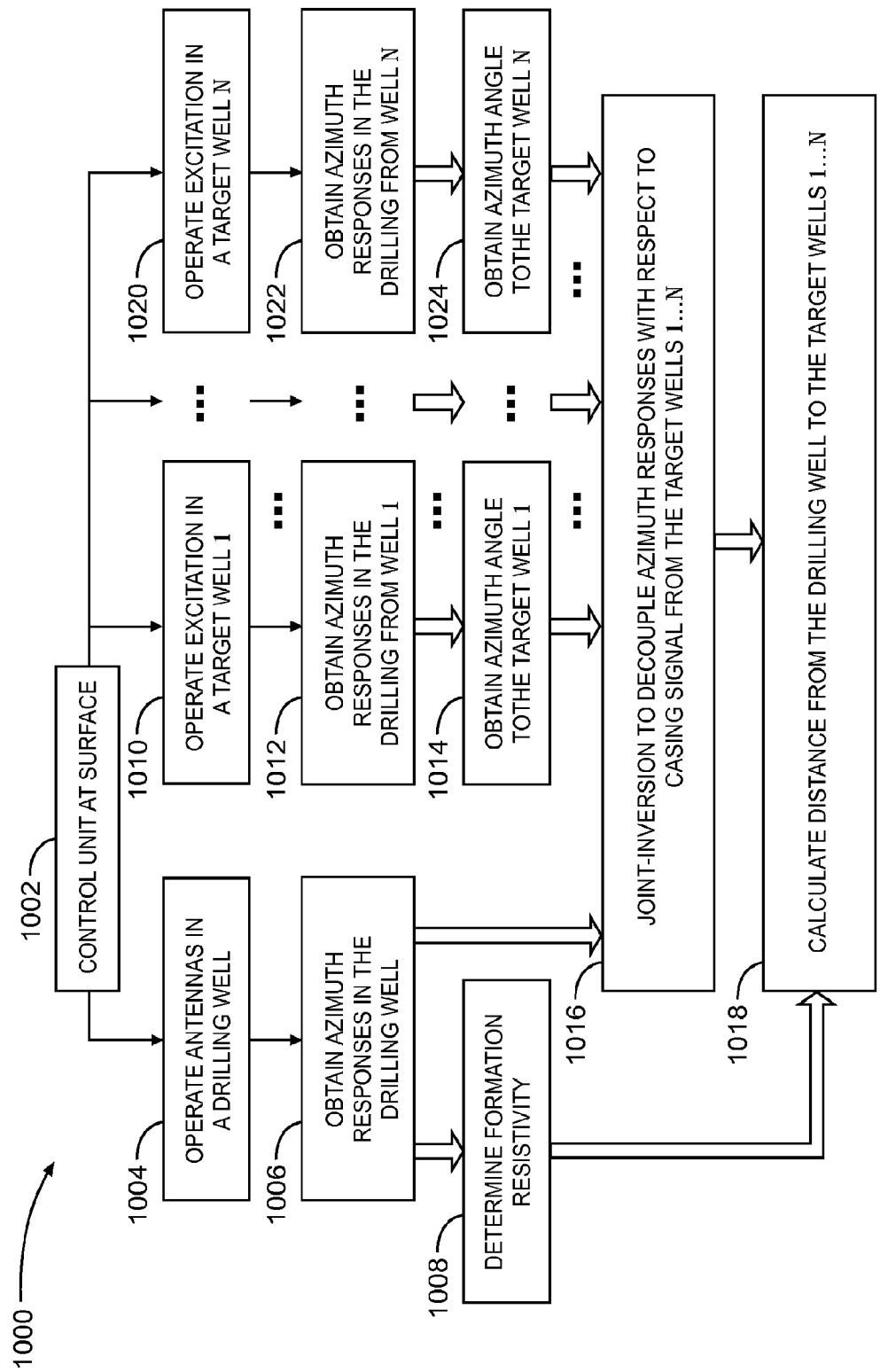
FIG. 10 is a flowchart of an example method of multi-well ranging according to various embodiments.

Referring now to FIG. 10, the flowchart depicts an example method 1000 of achieving multi-well ranging by implementing a joint-inversion algorithm among responses from various excitations. Although described in the context of using one tilted transmitter and one tilted receiver, various antenna configurations, such as multi-component antennas, and various numbers of antennas may be used in the drilling well in accordance with this application's disclosure. In addition, antennas in the drilling well may also determine formation properties without nearby casing interference based on higher frequency measurements.

Beginning in operation 1002, a control unit at the surface begins a measurement cycle by instructing the operations of excitation sources in the drilling and target wells. In operation 1004, the antenna(s) of a tool in a drilling well transmit electromagnetic signals into surrounding formations, with the azimuthal responses received at a receiver of the tool in the drilling well in operation 1006. The measured responses may be optionally used to determine formation resistivity in operation 1008.

In operation 1010, the control unit continues the measurement cycle by instructing the operation of an excitation source in a target well (e.g., target well number 1) to transmit electromagnetic signals into surrounding formations. In operation 1012, the azimuthal responses are received at the receiver of the tool in the drilling well. In other words, the excitation source of the target well introduces a current that flows downhole along a casing of the target well, and generates a magnetic field that surrounds the target well (e.g., target well number 1). The receiver of the tool in the drilling well obtains azimuthal responses from that magnetic field in operation 1012 and determines an azimuth angle from the drilling well to the target well number 1 in operation 1014. The above-described operations may be repeated for any number N of nearby target wells (e.g., using operations 1020, 1022, and 1024) to achieve multi-well ranging.

Once the system has determined a measurement of azimuthal responses to the various target wells, joint-inversion is applied in operation 1016 to decouple formation signals from casing signals from the target wells (e.g., target well number 1 through number N). Further, distance from the drilling well to the target wells is calculated in operation 1018 by using the decoupled responses of azimuthal signal amplitudes caused by the casings of the target wells (e.g., $A_{C1}$ with respect to target well number 1).

In one embodiment, the present disclosure may be embodied as a set of instructions on a computer readable medium comprising ROM, RAM, CD, DVD, hard drive, flash memory device, or any other computer readable medium, now known or unknown, that when executed causes a computing system, such as computer as illustrated in FIG. 1 or some other form of a data processing device, to implement a method of the present disclosure, for example the method described in FIG. 10.

Though described serially in the examples of FIG. 10, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the use of multiple receive antenna stations and/or multiple transmit antenna stations. In many situations, it may not be necessary to perform explicit distance and direction calculations. For example, the signal components may be extracted and converted to pixel colors or intensities and displayed as a function of tool position and azimuth. Assuming the target casing string is within detection range, it will appear as a bright (or, if preferred, a dark) band in the image. The color or brightness of the band indicates the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation. For example, multi-component antenna measurements may be used to obtain virtually-steered antenna measurements without requiring rotation of the tool or antennas. It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Other embodiments may be used and derived therefrom, such that structural and logical substitutions and changes may be made without departing from the scope of this disclosure. Combinations of the above embodiments, and other embodiments not specifically described herein, will be apparent to those of skill in the art upon reviewing the above description. This Detailed Description, therefore, is not to be taken in a limiting sense, and the scope of various embodiments is defined only by the appended claims, along with the full range of equivalents to which such claims are entitled.

Many other embodiments may be utilized for practicing the inventive subject matter than the illustrative examples discussed herein, and many structural and operational changes in addition to the alternatives specifically discussed herein may be made without departing from the scope of the inventive subject matter.

What is claimed is:

1. A method comprising:
   transmitting a first electromagnetic signal from a transmitter positioned within a drilling well;
   obtaining a first azimuthal signal at a receiver positioned within the drilling well in response to transmitting the first electromagnetic signal;
   transmitting a second electromagnetic signal from an excitation source positioned within a first target well;
   obtaining a second azimuthal signal at the receiver positioned within the drilling well in response to transmitting the second electromagnetic signal;
   applying a joint-inversion among the first and second azimuthal signals; and
   determining an azimuthal direction from the drilling well to the first target well based at least in part on the joint-inversion.

2. The method of claim 1, wherein the transmitter is included on a drilling collar or a downhole logging tool.

3. The method of claim 1, wherein applying the joint-inversion comprises applying a joint-inversion algorithm among the obtained first and second azimuthal signals, and further wherein the first and second azimuthal signals are received from different excitation sources.

4. The method of claim 1, further comprising:
   transmitting a third electromagnetic signal from an excitation source positioned within a second target well;
   obtaining a third azimuthal signal at the receiver positioned within the drilling well in response to transmitting the third electromagnetic signal; and
   determining an azimuthal direction from the drilling well to the second target well using the obtained first and third azimuthal signals.

5. The method of claim 4, further comprising determining a distance from the drilling well to the first and the second target well after determining the azimuthal direction from the drilling well to the first and the second target wells.

6. The method of claim 5, wherein determining the distance from the drilling well to the target well comprises estimating based on amplitudes of the obtained azimuthal signals with respect to different excitation sources.

7. The method of claim 6, further determining the distance from the drilling well to the target well further comprises decoupling a formation signal and a casing signal from the obtained azimuthal signals by varying operating frequencies of the transmitter positioned within the drilling well.

8. The method of claim 1, wherein the first and second azimuthal signal obtained at the receiver is proportional to $V_B^T(\beta_i) = A_{Double} \cos 2(\beta_i + \beta_0) + A_{Single} \cos(\beta_i + \beta_0) + A_{Const}$ where $\beta_i$ represents an azimuthal bin and $\beta_0$ represents an angle between a high side of a tool positioned within the drilling well and a direction to the target well.

9. A drilling system for multi-well ranging, comprising:
   a transmitter antenna to transmit a first electromagnetic signal into a surrounding formation and a receiver antenna to receive response signals from the surrounding formation, wherein the transmitter antenna and receiver antenna are included on a drilling collar or a downhole logging tool positioned within a drilling well;

excitation sources positioned along multiple target wells to transmit various electromagnetic signals into the surrounding formation from different target wells;

a controller operably connected to the transmitter antenna and the excitation sources to instruct the transmitter antenna and the excitation sources to transmit the first and various electromagnetic signals into the surrounding formation, and wherein the controller is configured to:

apply a joint-inversion among azimuthal signals received from different excitation sources;

determining azimuthal directions from the drilling well to multiple target wells based at least in part on the joint-inversion;

decoupling formation signal and casing signals from the multiple target wells by the obtained azimuthal directions; and determining distance from the drilling well to the multiple target wells after determining the azimuthal directions from the drilling well to the multiple target wells.

10. The drilling system of claim 9, wherein the excitation source is a downhole excitation source positioned downhole in the target well.

11. The drilling system of claim 9, wherein the excitation source is a surface excitation source positioned at a wellhead of the target well.

12. The drilling system of claim 9, further comprising a grounding position proximate to the target well.

13. The drilling system of claim 9, wherein at least one of the transmitter and receiver antennas is tilted relative to a tool axis.

14. The drilling system of claim 9, wherein the transmitter and receiver antennas are tilted in a same quadrant, in a set of opposite quadrants, or in a set of adjacent quadrants relative to a tool axis.

15. The drilling system of claim 9, wherein the excitation source induces a current that flows along a casing of the target well.

16. A downhole ranging system that comprises:

a transmitter antenna to transmit a first electromagnetic signal into a surrounding formation;

a receiver antenna to receive response signals from the surrounding formation;

an excitation source positioned along a target well; and a controller operably connected to the transmitter antenna and the receiver antenna to instruct the transmitter antenna to transmit the first electromagnetic signal into the surrounding formation, receive a first response signal from the surrounding formation in response to transmitting the first electromagnetic signal, receive a second response signal from the surrounding formation in response to a second electromagnetic signal transmitted from the excitation source in the target well, and determine an azimuthal direction from the downhole ranging tool to the target well based at least in part on a joint-inversion among response signals received at the receiver antenna.

17. The downhole ranging system of claim 16, wherein the transmitter antenna and receiver antenna are included on a drilling collar or a downhole logging tool positioned within a drilling well.

18. The downhole ranging system of claim 16, wherein the controller determines the azimuthal direction from the downhole ranging tool to a casing of the target well based at least in part on comparing a single-sinusoidal azimuthal response signal received at the receiver antenna to a double-sinusoidal azimuthal response signal.

19. The downhole ranging tool of claim 18, wherein the single-sinusoidal azimuthal response signal is generated by the firing of an excitation source positioned along a target well, and further wherein the double-sinusoidal azimuthal response signal is generated by the firing of the transmitter antenna positioned in a drilling well.

* * * * *